United States Patent [19]
Davey et al.

[11] Patent Number: 5,161,410
[45] Date of Patent: Nov. 10, 1992

[54] MASS FLOW SENSOR FOR VERY LOW FLUID FLOWS

[75] Inventors: Peter G. Davey, Oxford, United Kingdom; Jacques E. Hoffmann, Chicago, Ill.

[73] Assignee: InterTech Development Company, Skokie, Ill.

[21] Appl. No.: 661,685

[22] Filed: Feb. 27, 1991

[51] Int. Cl.$^5$ .................................. G01F 1/68
[52] U.S. Cl. .................... 73/204.22; 73/273
[58] Field of Search ............... 73/49.2, 49.3, 198, 73/199, 204.21, 204.22, 204.26, 273

[56] References Cited

U.S. PATENT DOCUMENTS

| | | | |
|---|---|---|---|
| 2,525,197 | 10/1950 | Beams et al. | 73/204.22 X |
| 3,326,040 | 6/1967 | Walsh | 73/204.22 X |
| 3,509,758 | 5/1970 | Newman | 73/49.2 |
| 3,691,821 | 9/1972 | Davey | 73/49.2 |
| 4,109,525 | 8/1978 | Kolb et al. | 73/201 |
| 4,400,975 | 8/1983 | McGarr | 73/204.22 |
| 4,406,163 | 9/1983 | Lofinit | 73/201 X |
| 4,501,144 | 2/1985 | Higashi | 73/204 |
| 4,651,564 | 3/1987 | Johnson | 73/204 |
| 4,672,854 | 6/1987 | Todorov et al. | 73/199 X |
| 4,858,643 | 8/1989 | Vavra | 137/486 |
| 4,913,192 | 4/1990 | Vavra | 137/889 |
| 5,014,552 | 5/1991 | Kamiunten | 73/204.21 |

OTHER PUBLICATIONS

"Installation Instructions for Microbridge Mass Airflow Sensor," pp. 1–4.

*Primary Examiner*—Herbert Goldstein
*Attorney, Agent, or Firm*—Arnold, White & Durkee

[57] ABSTRACT

A fluid flow sensing apparatus for measuring very low fluid flows comprising a fluid mass flow sensor for measuring the mass flow rate of a fluid from a temperature differential between predefined points within the sensor; a fluid flow channeling element for accepting the fluid at an input temperature and pressure and directing the fluid across the sensor, and wherein the input temperature and pressure about the sensor is maintained; and a fluid flow dampening element for providing an average fluid flow to the sensor.

11 Claims, 3 Drawing Sheets

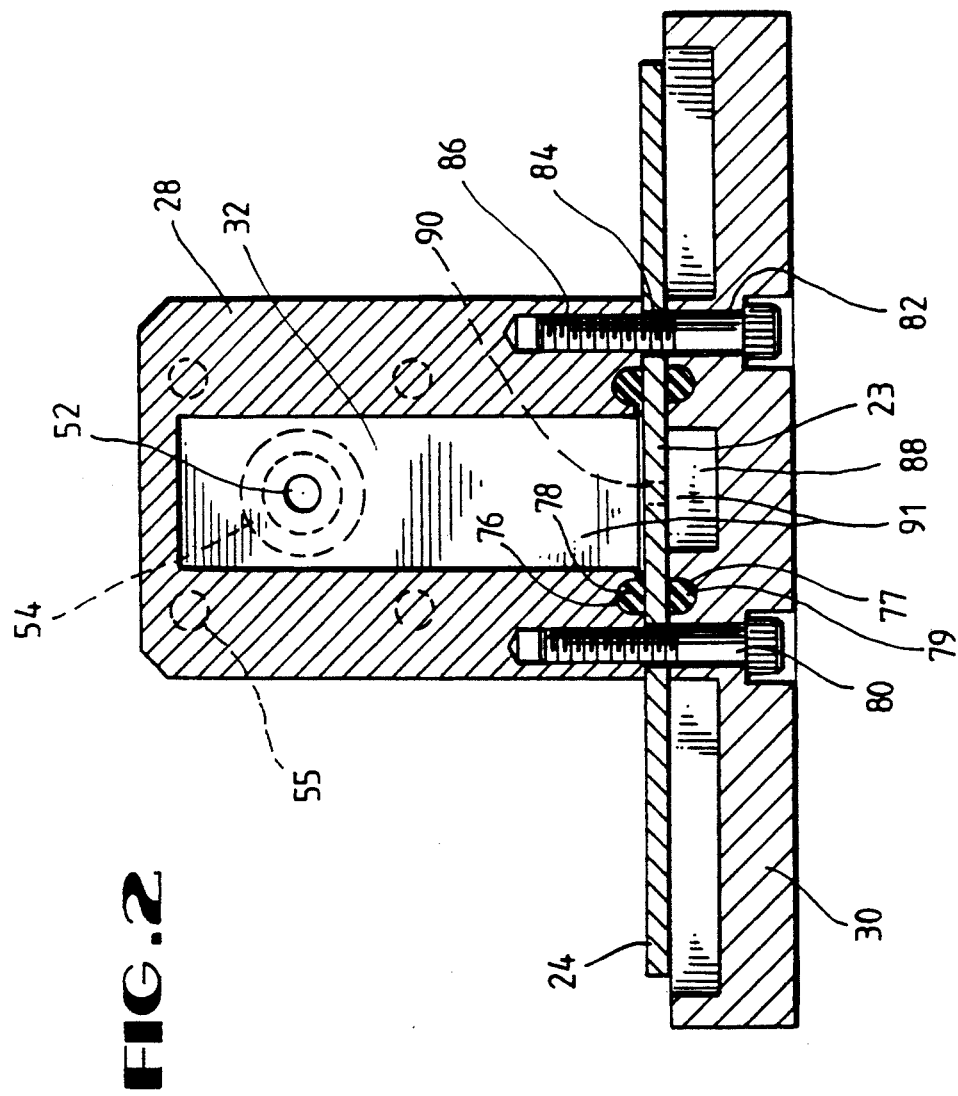

MASS FLOW SENSOR FOR VERY LOW FLUID FLOWS

FIELD OF THE INVENTION

The present invention relates generally to mass flow sensing devices and, more particularly, to improvements in the measurement of mass flow for very low fluid flow rates.

BACKGROUND OF THE INVENTION

Accurate measurement of very low fluid flows, in particular gas flows is a requirement of many industrial processes such as leak detection. Leak detection is used to determine the integrity of pressure vessels, containers and the like which contain or exclude fluids. Due to manufacturing technology improvements, very rapid economical testing of these vessels is required as a quality control measure to assure required vessel integrity in future performance. Such testing requires accurate measurement of very low leakage flow rates in the range of 0.01 to 10.00 standard cubic centimeters per minute (sccm) at a wide range of pressures while being subjected to harsh industrial environmental conditions. Many well known techniques that are utilized for this purpose are too costly, require unacceptably long testing times or require fluid temperature compensation which can introduce measurement inaccuracies.

In order to detect a leak within a containment vessel, a mass flow sensor may be connected between the pressurized containment vessel and a leaktight second pressurized vessel. Since the vessels are initially at equal pressure, a leak within the containment vessel reduces the pressure within the vessel causing a flow of gas into that vessel from the leaktight second vessel. Accordingly, the flow of gas from the leaktight vessel into the containment vessel would cause a gas mass flow rate through the mass flow sensor connecting the vessels which is proportional to the mass flow rate of the leaking gas.

A deposited thin film type mass flow sensor is best suited for fast, accurate measurement of these very low gas flows. Such deposited thin film type mass flow sensors are described in U.S. Pat. No. 4,651,564 as incorporated herein by reference, or as manufactured by Honeywell, Inc. as the MICRO Switch Model AWM200V MICROBRIDGE. A deposited thin film sensor includes a substrate which has a temperature sensing element disposed on both sides of a heating element. As a gas, referred to as the measured gas, flows across the substrate, it contacts the first temperature sensing element. The measured gas flow carries heat away from the first temperature sensing element, thereby reducing the temperature and electrical resistance of the temperature sensing element. Before the measured gas reaches the second temperature sensing element, the gas is warmed as it crosses a heating element which transfers heat to the measured gas. This heat transfer is sensed as the measured gas flows across the second temperature sensing element. The rate of heat transfer to the measured ga is a function of the mass flow rate of the measured ga and the temperature differential of the measured gas with respect to the heated film. The excess temperature of the heating element is controlled at a selected value. Accordingly, the temperature variation between the temperature sensing elements causes a resistance differential which is proportional to the mass flow rate of the measured gas. The heating and sensing elements referred to above are low mass, unsupported deposited thin films. The measured gas passes over and under each film assuring optimum heat transfer and rapid response to mass flow changes in the measured gas.

Heated deposited thin film sensor have deficiencies which limit their use in industrial leak testing. A deposited thin film type mass flow sensor is typically enclosed in a housing which directs the measured gas flow across the sensing and heating elements. A thin film sensor is fragile in that it has an operating pressure limit of 5 psi differential between the interior and the exterior of this protective housing which surrounds the sensor. The sensor, when enclosed only by the protective housing, could not operate under actual leak test pressures which may range from 25" Hg vacuum (about 200 mBar) to greater than 160 psig (11 Bar).

A second deficiency of heated film type mass flow sensors is flow rate measurement inaccuracy that is caused by variations in the ambient temperature or the temperature of the measured gas. Ambient air temperature variations cause the temperature sensing circuitry associated with the sensor to operate at a different temperature. To achieve the required flow sensitivity, precision operational amplifiers are utilized with closed loop gains of 1,000 to 10,000. At these gain levels, a temperature change causes a subsequent change in the nominal value of the resistors of the temperature sensing circuitry introducing measurement errors which are significant in low mass flow applications.

Undesirable changes in the sensitivity of the mass flow sensor also result when changes in the temperature of the measured gas cause inaccurate flow measurements. As the measured gas crosses over the substrate, the fluctuating temperature of the gas causes a variable rate of heat transfer between the sensing elements of the flow sensor because of the variable temperature of the heating element. To optimize measurement accuracy, the heating element of the mass flow sensor is maintained at a constant temperature differential above the ambient temperature which is sensed by the heater control circuitry associated with the sensor. The constant temperature of the heating element reduces, but does not eliminate the effects of variations in the measured gas' properties which may affect the resistances of the heating and sensing elements. A differential between the measured gas temperature and the ambient temperature may cause undesirable changes in both the initial offset, "zero", and in the sensitivity of the mass flow reading.

A third disadvantage in measuring very low gas flows with deposited thin film sensors is the tendency of the sensor to respond to random, short duration flow disturbances which are often present in industrial leak testing. These disturbances are normally dampened by electronic means that often require costly electronic filters which can introduce significant inaccuracies. This is particularly severe if an average flow rate is to be measured because the electrical output of the sensor for large fluctuations in flow input is generally asymmetrical or non-linear so that applying electronic dampening after the non-linearity causes a spurious change in the average reading for large higher frequency flow fluctuations.

In industrial leak testing applications, there has been a need for mass flow sensors which may be used to measure very low gas flow rates at a wide range of operating pressures and at varying ambient and measured gas temperatures. A mass flow sensor which correctly averages very low gas flow rates without responding to random, short duration flow disturbances is required to assure accurate mass flow rate measurements.

SUMMARY OF THE INVENTION

It is a general object of the present invention to provide an improved fluid mass flow sensor which overcomes the aforementioned deficiencies of the prior art and which measures fluid mass flow rates quickly and accurately.

It is the more specific object of the invention to provide an improved mass flow sensor which is capable of operating at pressure which exceed the pressure limitations of the fluid mass flow sensing element.

It is another object of this invention to provide an improved fluid mass flow sensor which will maintain its measurement accuracy over a wide range of measured fluid pressures.

It is a further object of this invention to provide an improved fluid mass flow sensor which will maintain its measurement accuracy while operating at varying ambient or measured fluid temperatures.

It is a still further object of this invention to provide a fluid mass flow sensor which has a dampened response to random, short duration fluid flow disturbances.

In accordance with the present invention, the foregoing objectives are realized by providing a fluid flow sensing apparatus for measuring very low fluid flows having a fluid mass flow sensor for measuring the mass flow rate of a fluid from a temperature differential between predefined points within the sensor; a fluid flow channeling element for accepting the fluid at an input temperature and pressure and directing the fluid across the sensor, and wherein the input temperature and pressure about the sensor is maintained; and a fluid flow dampening element for providing an average fluid flow to the sensor.

According to one aspect of the present invention, a fluid flow sensing apparatus for measuring very low fluid flows includes a fluid mass flow sensor having a substrate with a thin film heater maintained at an essentially constant temperature greater than ambient temperature, and first and second thin film temperature sensors disposed on opposite sides of the thin film heater. The temperature differential between the first and second sensors indicates the mass flow rate of the fluid. The apparatus has a fluid flow channeling element which accepts a fluid at an input temperature and pressure and directs the fluid across the sensor. The channeling element includes a first leak-proof enclosure for housing the sensor, and an inlet port and an outlet port of the first enclosure for directing fluid flow across the sensor. A second leak-proof enclosure maintains the input temperature and pressure about the sensor, and has an inlet and an outlet in at least one of its side walls. One of the ports of the first enclosure is housed within the second enclosure, and the other port is lodged within the inlet or outlet of the second enclosure so that the pressure within the second enclosure and the pressure about the sensor is equivalent. The apparatus also includes a temperature stabilizer which stabilizes the temperature within the second enclosure and the temperature of the flowing fluid prior to entering the first enclosure at an essentially constant temperature, wherein the temperature is above ambient temperature or the temperature of the flowing fluid before entering the apparatus. A flow restricting orifice of the apparatus is coupled to the second enclosure in order to attenuate rapid fluid flow disturbances in the vicinity of the first and second temperature sensors.

BRIEF DESCRIPTION OF THE DRAWINGS

Other objects and advantages of the invention will be apparent from the following detailed description and the accompanying drawings in which:

FIG. 2 is a cross-sectional view of the fluid mass flow sensing apparatus taken along the line 2—2;

Figure 1:
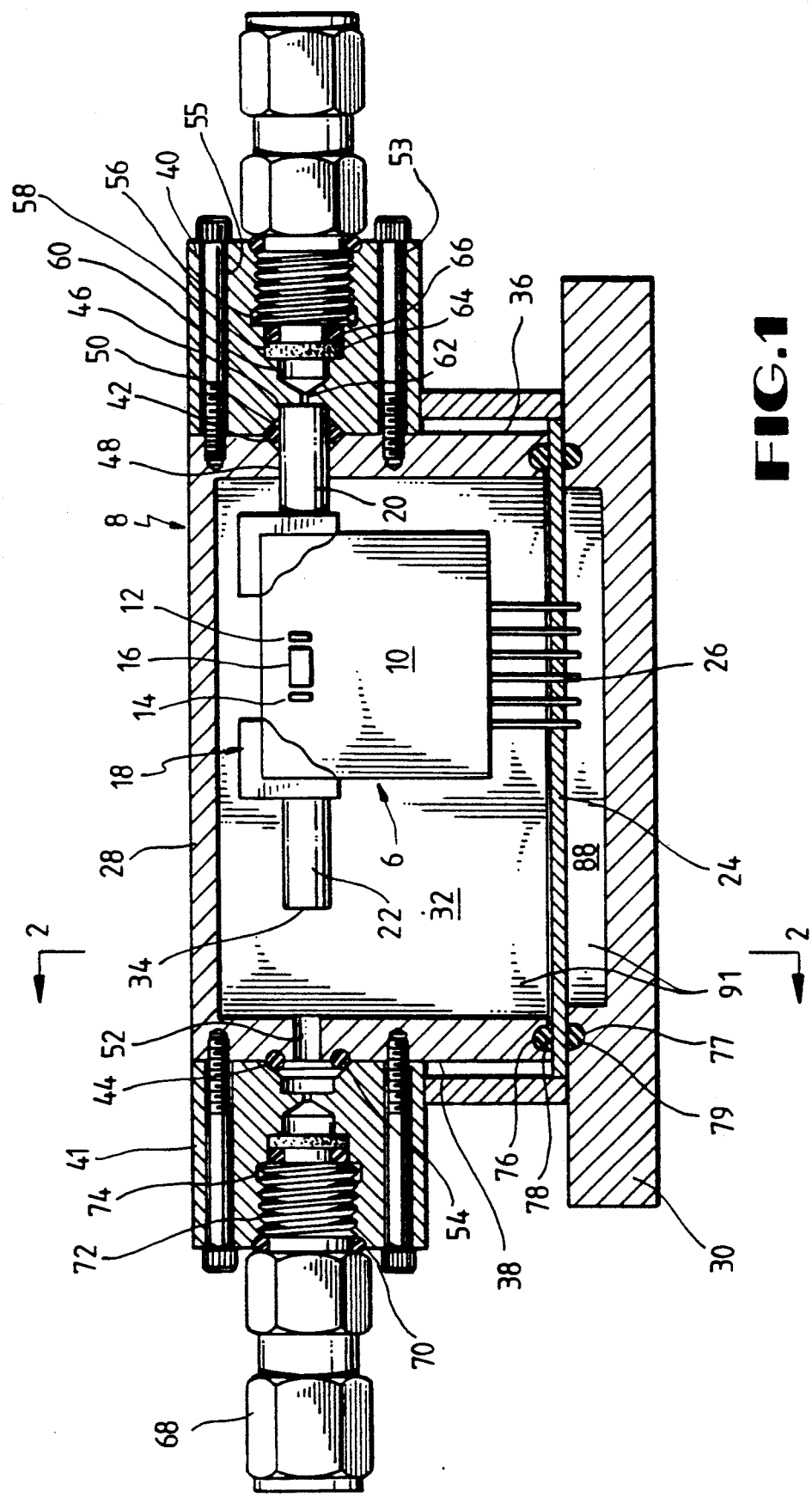
FIG. 1 is a longitudinal sectional view of the preferred embodiment of the subject invention with the sensor housing partially removed.

While the invention is susceptible to various modifications and alternative forms, a specific embodiment thereof has been shown by wa of example in the drawings and will be described in detail. It should be understood, however, that it is not intended to limit the invention to the particular form described, but, on the contrary, the invention is to cover all modifications, equivalents and alternatives found within the spirit and scope of the invention as defined by the appended claims.

DETAILED DESCRIPTION OF THE PREFERRED EMBODIMENT

Turning now to the drawings and referring specifically to FIGS. 1 and 2, a preferred embodiment of the present invention is illustrated in the form of a mass flow sensor arrangement. The arrangement includes a gas mass flow sensing element 6 for measuring the mass flow rate of the measured gas from the temperature differential between predefined points within the sensing element 6. A gas flow channeling element 18 accepts the measured gas at an input temperature and pressure and directs the measured gas across the sensing element 6. Surrounding the sensing element 6 and the flow channeling element 8, an enclosure 8 maintains the input temperature and pressure about the sensing element 6 and provides an average measured gas flow minimizing the response of the sensing element 6 to rapid gas flow disturbances.

As the measured gas enters the arrangement from a supply source and flows through the enclosure 8, the measured gas temperature approximates that of the enclosure 8 as a result of heat transfer between the measured gas and the enclosure 8. Additionally, the response time of the sensing element 6 is slowed as the gas enters the gas flow channeling element 18 because the velocity of the measured gas flow is reduced. The measured gas pressure is equivalent to the pressure within the enclosure 8 when the measured gas enters the gas flow channeling element 18. These temperature, pressure and flow modifications occur within the enclosure 8 to provide an environment of constant temperature and pressure surrounding the sensing element 6 to allow accurate measurement of very low gas flows under industrial conditions that are otherwise not conducive to low gas flow measurement. The arrangement of the present invention eliminates the limitations of the prior art mass flow sensors in that the effect of the ambient temperature is controlled, measured gas temperature fluctuations are stabilized, operating pressure limitations are overcome and flow disturbances in the measured gas are controlled by the enclosure 8 surrounding the sensing element 6.

The sensing element 6 includes a substrate 10 having sensing elements 12 and 14 disposed on opposite sides of a heating element 16. As the measured gas flows from right to left across the substrate 10 as viewed in FIG. 1, the temperature and electrical resistance of the sensing element 12 is reduced because the flow carries heat away from the sensing element 12. The gas is warmed as it crosses the heating element 16 and transfers some of this heat to the sensing element 14. The temperature variation between the sensing elements 12 and 14 causes a resistance differential which is proportional to the mass flow rate of the measured gas because of the constant temperature of the heating element 16.

In order to mount the substrate 10 and protect the sensor elements, the sensing elements 12 and 14 and the heating element 16 are enclosed by the flow channeling element which is a leak tight housing 18 having an inlet port 20 and an outlet port 22. The measured gas enters the housing 18 through the inlet port 20, passing over the sensor elements 12, 16 and 14 and exiting through the outlet port 22. Because the measured gas flow can be bidirectional, the designation of inlet and outlet ports is arbitrary.

The sensing elements 12 and 14 and the heating element 16 are electrically coupled to a circuit board 24 by a plurality of conductive pins 26 which are soldered to the semiconductor substrate 10 and the circuit board 24. The plurality of conductive pins 26 position the semiconductor substrate 10 perpendicularly above the circuit board 24.

The substrate 10, the housing 18, the outlet port 22, and the center portion 23 of the circuit board 24 are contained within an enclosure 28 having a base 30. The enclosure 28, comprised of a thermally conductive material such as aluminum, is rectangularly shaped and has an open end internal cavity 32. The volume of the internal cavity 32 must be large enough to enclose the housing 18, and provide sufficient space between the exterior end face 34 of the outlet port 22 and the inner surface of the internal cavity 32 to allow unimpeded gas flow from the outlet port 22 in order to equalize the internal and external pressures on the housing 18. The volume must also provide flow dampening as will be later described.

To prevent gas leakage between the outer surfaces 36 and 38 of the enclosure 28 and the respective adjacent bosses 40 and 41 which are axially attached thereto, leak tight seals are formed by means of O-rings 42 and 44, respectively. The edge of the bosses 40 and 41, which is attached to the outer surface 36 or 38, includes a recess 46. The inlet port 20 of the housing 18 is inserted through an opening 48 of the enclosure 28 such that the port 20 rests within the recess 46 of the boss 40. The boss 40 has a conical recess 50 adjacent the recess 46 which diverges towards the outer surface 36 to enclose the O-ring 42. The O-ring 42 is fitted around the inlet port 20 and is enclosed between the outer surface 36 and the conical recess 50 to provide a leak-proof seal. The boss 40 is identical to the boss 41. Opposite the opening 48, an opening 52 of the enclosure 28 provides an outlet for the measured gas within the internal cavity 32. The conical recess 50 encloses the O-ring 44 which rests within a circular indentation 54 of the outer surface 38 to prevent gas leakage between the outer surface 38 and the adjacent surface of the boss 41.

The boss 40 or 41, comprised of thermally conductive material, is firmly attached to the enclosure 28 by a plurality of screws 53 which are each threaded into a hole 55 which extends through the boss 40 or 41 and partially into the side walls of the enclosure 28.

In order to connect a supply of gas to the enclosure 28, each boss 40 or 41 includes a large recess 56 at the outer surface of the boss 40 or 41, a recess 58 adjacent the recess 56, a converging recess 60 adjacent the recess 58, and a flow restricting orifice 62 between the converging recess 60 and the recess 46. A filter 64 comprised of thermally conductive sintered filter media is placed within the recess 58, and is held in position by an O-ring 66 which holds the filter 64 against the recess 58 providing thermal contact between the periphery of the filter 64 and the recess 58. The filter 64 provides for heat transfer to the measured gas from the enclosure 28 by way of the boss 40 or 41, as will be described in detail below. The filter 64 also prevents the passage of particles which are typically 5 microns or larger into the internal cavity 32. The O-ring 66 abuts against the inner face of a connector 68 which is inserted into the recess 56. The connector 68 is coupled to the supply or exhaust piping (not shown) for the measured gas.

In assembling the connector 68 to the boss 40, an O-ring 70 is placed on the outer edge of the recess 56 to provide a leak proof fitting between the connector 68 and the recess 56. For the purpose of drawing the connector 68 firmly against the recess 56, the boss 40 or 41 and the connector 68 include respective telescoping sleeve portions with cooperating threaded surfaces 72 and 74 respectively. Thus, when the connector 68 is rotated in a first direction, it is advanced towards the boss 40 or 41 in the axial direction so as to draw the connector 68 and the boss 40 or 41 into engagement. To disengage the connector 68, it is simply rotated in the opposite direction to retract it away from the boss 40 or 41 until the threaded surfaces 72 and 74 are disengaged.

The internal cavity 32 of the enclosure 28 is enclosed to form a leak proof containment when the circuit board 24 and the base 30 are coupled to the bottom surface of the enclosure 28. The bottom surface of the enclosure 28 and the top surface of the base 30 each include an elongated oval shaped indentation 76 and 77, respectively, into which O-rings 78 and 79, respectively, are inserted to form a fluid type seal when the center portion 23 of the circuit board 24 is enclosed between the bottom surface of the enclosure 28 and the top surface of the base 30. The seal is formed by passing a plurality of screws 80 through a plurality of base holes 82 and a plurality of circuit board holes 84, and threading each screw 80 into a threaded hole 86 which extends through the bottom surface of the enclosure 28 perpendicular to the base 30.

Within the elongated oval shaped indentation 77 of the base 30, a cavity 88 is provided through which the measured gas enters from the internal cavity 32 by way of at least one a vent hole 90 in the center portion 23 of the circuit board 24. Accordingly, no bursting or flexing forces are applied to the circuit board 24 and the measured gas within the enclosed cavity 91, which is formed by the internal cavity 32 and the cavity 88, is at the same pressure and temperature. Reference resistors 92 and 94 (FIG. 3), mounted on the center portion 23 of the circuit board 24 which is sealed within the enclosed cavity 91, are maintained at the approximate temperature of the enclosure 28 to prevent temperature changes from adversely affecting the resistors as will be described below.

Figure 4:
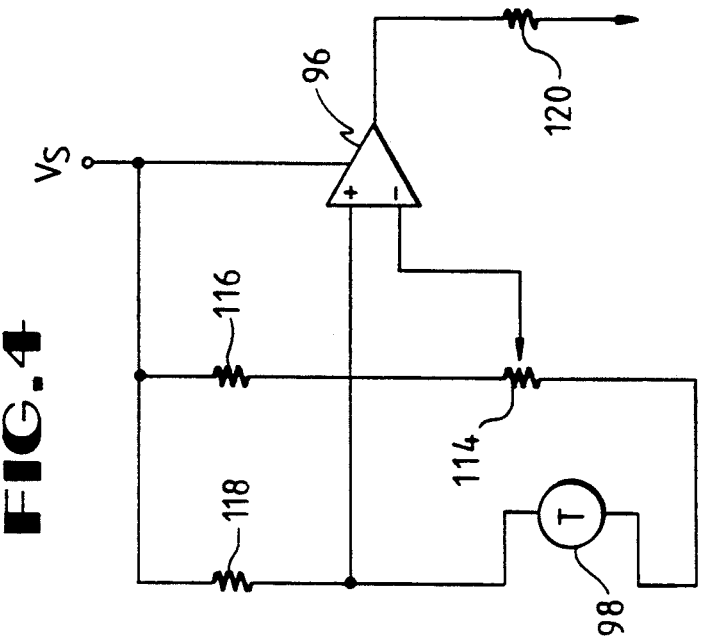
FIG. 4 is a schematic diagram of a preferred embodiment of an electrical circuit to maintain the temperature of the second sensor enclosure at a predetermined value.

In order to control the temperature of the enclosing means formed by the enclosure 28 and the base 30 at a value higher than the maximum expected ambient or measured gas temperature, a high power amplifier 96 (FIG. 4) attached to the enclosure 28 by a screw (not shown) forms a low thermal resistance connection to the external surface of the enclosure 28. As shown in FIG. 4, a temperature sensor 98 for measuring the ambient temperature is coupled to the amplifier 96. The temperature sensor 98 is inserted into a cavity (not shown) in a wall of the enclosure 28 so that the temperature sensor 98 is in close thermal contact with the cavity. Since the temperature of the cavity approximates the temperature of the thermally conductive enclosure 28, the temperature sensed by the temperature sensor 98 is approximately that of the enclosure 28. The connection of the amplifier 96 to the external surface of the enclosure 28 causes the temperature of the enclosing means to increase as a result of the power dissipation of the amplifier 96.

The heat content of the enclosure 28 is conducted to the bosses 40 and 41 and transferred to the thermally conductive filters 64 which transfer the heat to the measured gas as it flows through the filters 64. This heat transfer stabilizes the measured gas temperature at the approximate temperature of the enclosure 28. Accordingly, the filter 64 minimizes the effect of fluctuations in the measured gas temperature by causing the gas within the enclosed cavity 91 to be at an essentially constant temperature. The temperature stabilization circuitry will be further described below.

The mass flow sensor is compensated for pressure changes to maintain the measurement accuracy of the sensor. The pressure of the measured gas within the enclosed cavity 91 is equivalent to the pressure of the gas as it flows through the outlet port 22. Consequently, the pressure applied to the outer wall of the housing 18 is the pressure within the internal cavity 32 such that the only pressure change within the system is the pressure drop across the sensor. The maximum differential pressure between the interior of the housing 18 and its exterior is limited to the pressure drop across the sensor regardless of the actual pressure of the measured gas. Changes in the absolute pressure of the measured gas within the housing 18 result in variations in the properties of the measured gas, such as density fluctuations, which may alter the thermal conductance and other operating characteristics of the sensing element 6. The pressure compensation of the mass flow sensor for these variations in absolute pressure will be described in detail below.

In addition to temperature and pressure fluctuations, a mass flow sensor may respond to random, short durations flow disturbances which ar often present in industrial leak testing. These very short, high-amplitude flow fluctuations are eliminated by applying a pneumatic lag to the measured gas flow as it enters the housing 18. The pneumatic lag also eliminates pressure shock-fronts caused by automatic switching of valves which apply the high pressures used in some leak testing applications, which may otherwise damage the mechanically delicate elements 12, 14 and 16. The lag results from the pneumatic resistance of the upstream and downstream orifices 62 and the pneumatic capacity of the internal volume of the cavity 32. This combination of resistance and capacity gives rise to a lag, or time-constant, in the same way as the more familiar combination of an electrical resistance and capacitance. As the measured gas flows through the filter 64, the measured gas temperature approximates the temperature of the enclosure 28. The response time of the sensor is slowed as the measured gas flows through the boss 40 or 41 to enter the housing 18 because the gas flow velocity is reduced by the volume of the internal cavity 32 acting with the flow resistance of the orifices 62. Accordingly, the variable temperature, pressure or flow rate of the measured gas as it enters the connector 68 will be modified as it passes through the boss 40 or 41 to eliminate the inaccuracies which are inherent in a heated film type mass flow sensor.

Figure 3:
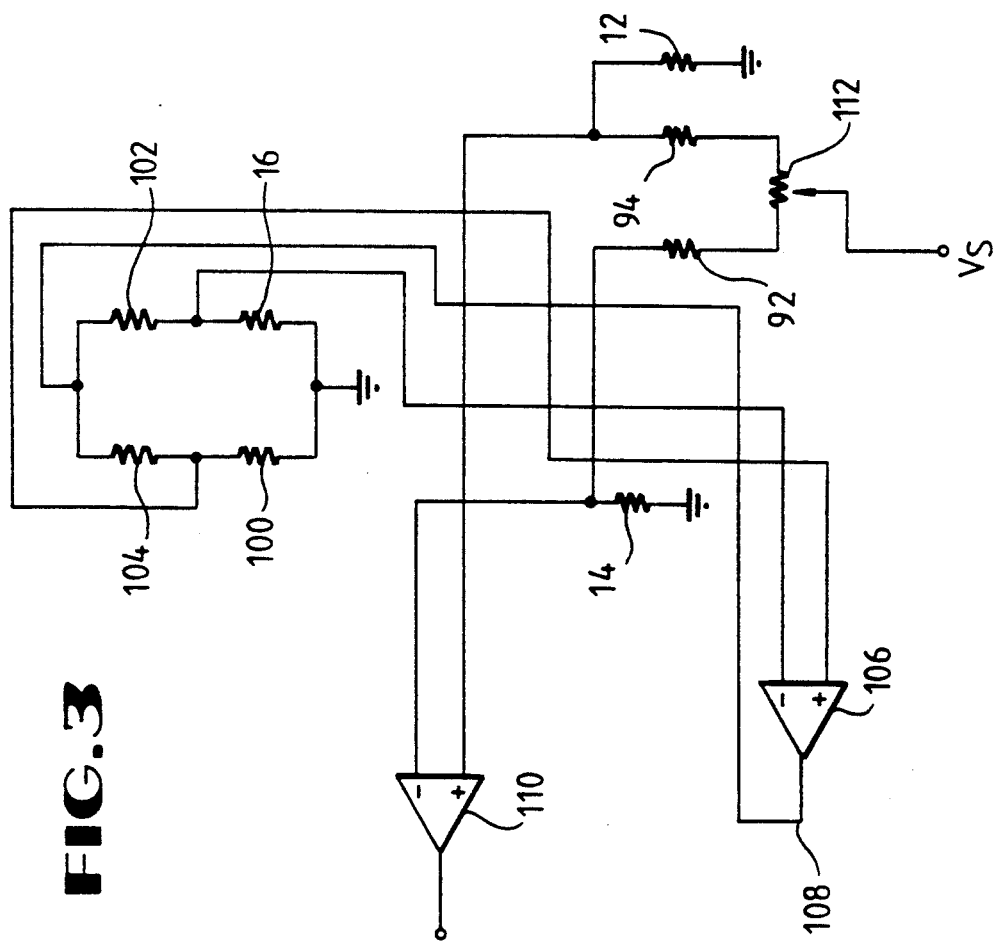
FIG. 3 is a schematic diagram of the heated film type mass flow sensor including a pressure compensation modification.

FIG. 3 depicts a schematic diagram of the mass flow sensor drive circuit and the heated thin film type mass flow sensor. The mass flow sensor of the preferred embodiment of this invention utilizes two Wheatstone bridge circuits; a heated film heat control bridge and a temperature sensing bridge. The heated film bridge circuit controls the temperature of the heated film element at a constant differential above the ambient temperature of the substrate 10 and comprises the heating element 16, an ambient temperature sensing element 100, and reference resistors 102 and 104 which set the sensor temperature. The bridge will balance when the temperature of the heating element 16 is equal to the sum of the temperature sensed by the sensing element 100 and the predetermined constant differential temperature established by the reference resistors 102 and 104. If the temperature of the sensing element 100 decreases, the error signal applied to the input terminals of an amplifier 106 decreases the amplifier output voltage 108 reducing the bridge voltage; consequently, the temperature of the heating element 16 decreases to maintain the differential temperature between the resistors 102 and 104. Conversely, if the temperature of the sensing element 100 increases, the amplifier output voltage 108 increases to raise the bridge voltage and the temperature of the heating element 16 in order to maintain the predetermined temperature differential.

The temperature sensing bridge detects the quantity of heat transferred from the heating element 16 to the measured gas and comprises sensing elements 12 and 14. As above described, the sensing elements 12 and 14 are disposed on the substrate 10 on opposite sides of the heating element 16 such that the measured gas must flow over the sensing element 2 or 14 before contacting the heating element 16. The rate of heat transfer to the measured gas is a function of the mass flow rate of the measured gas and the temperature differential of the gas with respect to the heated film. Since the temperature of the heating element 16 is controlled at a selected value, the temperature differential between the sensing elements 12 and 14 is directly proportional to the mass flow rate of the measured gas.

The bridge error signal, the polarity of which is affected by the direction of gas flow, is applied to the input terminals of a high gain instrumentation amplifier 110. Since the absolute value of the bridge error voltage is often less than 0.01 mV, amplifier gains of 1,000 to 10,000 are required to yield a usable output. At these gain levels, slight unbalances in the reference resistors 92 and 94 result in large voltage changes in the output of the amplifier 110 causing flow rate measurement errors. As aforementioned, these errors are eliminated because the temperature of the resistors 92 and 94 is stabilized by enclosing the center portion 23 of the circuit board 24 within the enclosed cavity 91. Accordingly, variations in ambient or measured gas temperatures will minimally affect the temperature surrounding the resistors 92 and 94 so that accurate flow measurements are obtained over a wide range of temperature conditions. A similar benefit may be obtained if the amplifier 110 is also enclosed within the cavity 91.

The mass flow sensor is compensated for pressure changes in order to maintain measurement accuracy by a potentiometer 112 positioned between the reference resistors 92 and 94. The potentiometer 112 is adjusted to balance the sensing bridge for null when the enclosed cavity 91 is pressurized to a selected test pressure and there is no measurable gas flow. This offset of nominal bridge balance compensates for the change in heat transfer resulting from the pressure change. This method of pressure compensation is disclosed in U.S. Pat. No. 3,691,821, entitled LEAK DETECTORS, and issued on Sept. 19, 1972.

As illustrated in FIG. 4, a temperature stabilization bridge controls the temperature of the enclosing means at a value above the maximum expected ambient or measured gas temperature and is comprised of the temperature sensor 98, a variable resistor 114, and reference resistors 116 and 118. The values of the resistors 116 and 118 ar selected so that the bridge will balance when the temperature sensed by the temperature sensor 98 is a predetermined value. When the sensed temperature is less than the predetermined value, the unbalanced bridge signal increases the output voltage of the amplifier 96, increasing the current through a resistor 120. A maximum voltage output from the amplifier 96 results in a small voltage drop across the resistor 120 in comparison to the supply voltage. However, the current thorough the resistor 120 increases in direct proportion to the increased output voltage of the amplifier 96 and thus increases the power dissipation of the amplifier 96 in a substantially linear fashion. Consequently, the increased temperature of the amplifier 96 increases the temperature of the enclosure 28, the bosses 40 and the filters 64 to stabilize the temperature of the measured gas as previously described.

The foregoing description is not limited to the specific embodiment herein described, but rather by the scope of the claims which are appended hereto. For example, although the invention has been described with reference to unidirectional flow, bidirectional flow through the mass flow sensor arrangement is equally effective. The fluid whose flow is measured by the sensor may be a liquid, pressurized or otherwise, instead of a gas. Additionally, the resistor 114 need not be a variable resistor as is shown in FIG. 4. The bosses need not be identical to each other, nor do the inlet and outlet of the enclosure need to be in opposing side walls. Moreover, the converging and diverging recesses within the bosses of the particular embodiment herein described are not required to minimize the flow disturbances or to obtain accurate flow measurements.

We claim:

1. A fluid flow sensing apparatus for measuring very low fluid flows comprising:
    fluid mass flow sensing means for measuring the mass flow rate of a fluid from a temperature differential between predefined points within the sensing means;
    fluid flow channeling means for accepting a fluid at an input temperature and pressure and directing the fluid across said sensing means, said channeling means including a first leak-proof enclosure for housing said sensing means, wherein the enclosure includes an inlet port and an outlet port for fluid flow across the sensing means; and
    means for maintaining said input temperature and pressure about said sensing means, said maintaining means including a second leak-proof enclosure wherein either the inlet port or the outlet port of the first enclosure is housed within the interior of the second enclosure such that the pressure within the second enclosure is equivalent to the pressure about the sensing means.

2. The fluid flow sensing apparatus of claim 1 including means for dampening the fluid flow to provide an average fluid flow within said channeling means.

3. The fluid flow sensing apparatus of claim 1 wherein the fluid mass flow sensing means includes a substrate having a thin film heater maintained at an essentially constant temperature greater than ambient temperature, and first and second thin film temperature sensors disposed on opposite sides of the thin film heater wherein the temperature differential between the first and second sensors indicates the mass flow rate of the fluid.

4. A fluid flow sensing apparatus for measuring very low fluid flows comprising:
    fluid mass flow sensing means including a substrate having a thin film heater maintained at an essentially constant temperature greater than ambient temperature, and first and second thin film temperature sensors disposed on opposite sides of the thin film heater wherein the temperature differential between the first and second sensors indicates the mass flow rate of the fluid;
    fluid flow channeling means for accepting a fluid at an input temperature and pressure and directing the fluid across said sensing means, wherein the channeling means comprises a first leak-proof enclosure for housing said sensing means, and an inlet port and an outlet port of the first enclosure for directing fluid flow across the sensing means;
    means for maintaining said input temperature and pressure about said sensing means, wherein the maintaining means comprises a second leak-proof enclosure having an inlet and an outlet in at least one of its side walls, wherein the second enclosure houses the first enclosure such that one of the ports of the first enclosure in housed within the interior of the second enclosure, and the other port is lodged within the inlet or outlet of the second enclosure so that the pressure within the second enclosure and the pressure about the sensing means is equivalent; and
    temperature stabilizing means for stabilizing the temperature within the second enclosure and the temperature of the flowing fluid prior to entering the first enclosure at an essentially constant temperature.

5. The fluid flow sensing apparatus of claim 4 wherein the temperature stabilizing means comprises:
    temperature sensing means coupled to the second enclosure for measuring the temperature of the second enclosure;
    heating means coupled to the second enclosure for heating the second enclosure; and
    control means for comparing the sensed temperature to a selected temperature, and for adjusting the heat supplied to the heating means in an amount to stabilize the temperature of the second enclosure to equal the selected temperature which is above ambient temperature or the temperature of the flowing fluid before entering the apparatus; and heat exchange means for stabilizing the temperature of the fluid flow before the fluid enters the first enclosure so that the fluid temperature approximates the temperature of the second enclosure.

6. The fluid flow sensing apparatus of claim 5 wherein the heating means utilizes the heat dissipation of an amplifier in close thermal contact with the second enclosure.

7. The fluid flow sensing apparatus of claim 4 including means for dampening the fluid flow to provide an average fluid flow within said channeling means.

8. The fluid flow sensing sensing apparatus of claim 7 wherein said dampening means comprises a flow restricting orifice coupled to the second enclosure for attenuating rapid fluid flow disturbances in the vicinity of the first and second temperature sensors.

9. A fluid flow sensing apparatus for measuring very low fluid flows comprising:

fluid mass flow sensing means including a substrate having a thin film heater maintained at an essentially constant temperature greater than ambient temperature, and first and second thin film temperature sensors disposed on opposite sides of the thin film heater wherein the temperature differential between the first and second sensors indicates the mass flow rate of the fluid fluid flow channeling means for accepting a fluid at an input temperature and pressure and directing the fluid across said sensing means, wherein the channeling means comprises a first leak-proof enclosure for housing said sensing means, wherein the enclosure includes an inlet port and an outlet port for fluid flow across the sensing means;

means for maintaining said input temperature and pressure about said sensing means, wherein said maintaining means comprises a second leak-proof enclosure having an inlet and an outlet in at least one side wall, wherein the second enclosure houses the first enclosure such that one of the ports of the first enclosure is housed within the second enclosure, and the other port is lodged within the inlet or outlet of the second enclosure so that the pressure within the second enclosure and the pressure about the sensing means is equivalent;

temperature stabilizing means for stabilizing the temperature within the second enclosure and the temperature of the flowing fluid prior to entering the first enclosure at a constant temperature, wherein the temperature is above ambient temperature or the temperature of the flowing fluid before entering the apparatus; and pneumatic dampening means for minimizing the response of the first and second temperature sensors to rapid fluid flow disturbances by providing an average fluid flow within said channeling means.

10. The fluid flow sensing apparatus of claim 9 wherein the dampening means comprises:

two orifices coupled to the second enclosure for restricting the fluid flow across the sensing means.

11. The fluid flow sensing apparatus of claim 9 wherein the temperature stabilizing means comprises:

heat exchange means for stabilizing the temperature of the fluid flow before the fluid enters the first enclosure so that the fluid temperature approximates the temperature of the second enclosure;

temperature sensing means coupled to the second enclosure for measuring the temperature of the second enclosure;

heating means coupled to the second enclosure for heating the second enclosure; and control means for comparing the sensed temperature to a selected temperature, and for adjusting the heat supplied to the heating means in an amount to stabilize the temperature of the second enclosure to equal the selected temperature.

* * * * *